United States Patent
Li et al.

(10) Patent No.: US 11,211,632 B2
(45) Date of Patent: Dec. 28, 2021

(54) SQUARE SECTION LIQUID METAL BATTERIES WITH GRID DEVICE TO SUPPRESS INSTABILITIES OF FLUIDS

(71) Applicant: Dalian University of Technology, Dalian (CN)

(72) Inventors: Benwen Li, Dalian (CN); Ke Liu, Dalian (CN); Lu Chen, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 203 days.

(21) Appl. No.: 16/439,590

(22) Filed: Jun. 12, 2019

(65) Prior Publication Data

US 2020/0203753 A1 Jun. 25, 2020

(30) Foreign Application Priority Data

Dec. 25, 2018 (CN) .......................... 201811589306.X

(51) Int. Cl.

| H01M 10/39 | (2006.01) |
|---|---|
| H01M 10/38 | (2006.01) |
| H01M 4/40 | (2006.01) |
| H01M 10/02 | (2006.01) |
| H01M 4/36 | (2006.01) |
| H01M 10/0563 | (2010.01) |
| H01M 4/38 | (2006.01) |

(52) U.S. Cl.
CPC ........... *H01M 10/02* (2013.01); *H01M 4/368* (2013.01); *H01M 4/38* (2013.01); *H01M 10/0563* (2013.01); *H01M 2300/0048* (2013.01)

(58) Field of Classification Search
CPC .. H01M 10/02; H01M 4/368; H01M 10/0563; H01M 4/38; H01M 2300/0048; H01M 10/399; Y02E 60/10
See application file for complete search history.

(56) References Cited

U.S. PATENT DOCUMENTS

| 4,029,860 A | * | 6/1977 | Vissers | ............... | H01M 10/399 |
|---|---|---|---|---|---|
| | | | | | 429/122 |
| 2011/0014505 A1 | * | 1/2011 | Bradwell | ............ | H01M 50/148 |
| | | | | | 429/51 |
| 2015/0004455 A1 | * | 1/2015 | Bradwell | ............ | H01M 50/138 |
| | | | | | 429/103 |

* cited by examiner

*Primary Examiner* — Lisa S Park
(74) *Attorney, Agent, or Firm* — Muncy, Geissler, Olds & Lowe, P.C.

(57) ABSTRACT

Square section liquid metal batteries (LMBs) with a grid device to suppress instabilities of fluids. The LMBs include a shell, negative current collector, negative material, metallic nets/plates, grid device, electrolyte, positive material, rectangular holes on partitions of grid device, and positive current collector. The positive material, electrolyte, and negative material are filled in the shell and automatically stratified from bottom to top according to the density from large to small. The negative current collector is linked with negative material, and the positive current collector is linked with positive material. The grid device is composed of partitions which cross each other and pass through the negative material, the electrolyte vertically in sequence, and extend inside the positive material. There are rectangular holes opened on the grid device, and the vertical height of each rectangular hole is larger than the biggest displacement of electrolyte during charging and discharging processes.

10 Claims, 9 Drawing Sheets

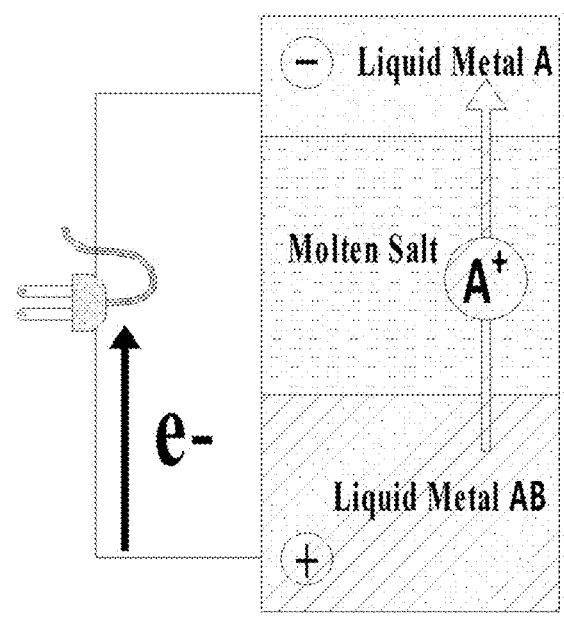
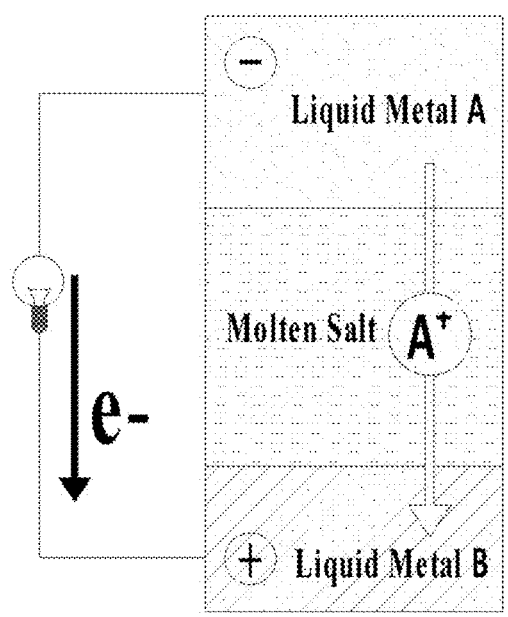
Fig.1A          Fig.1B
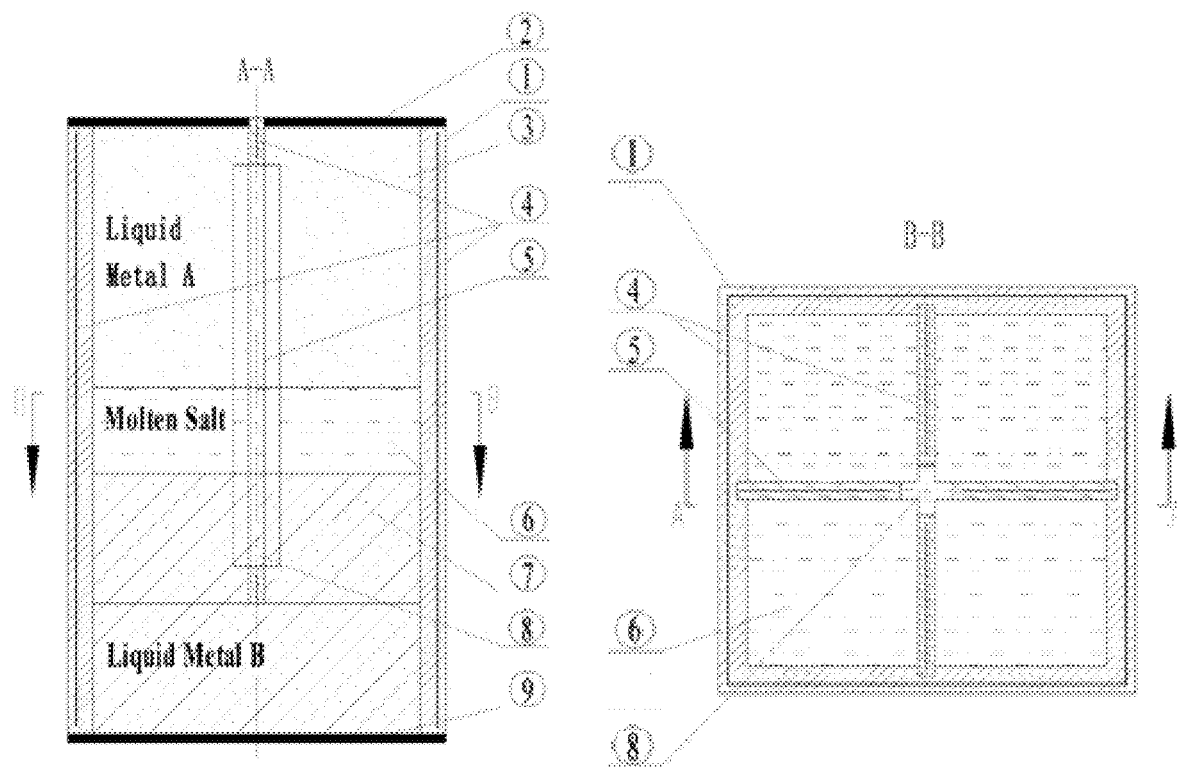
Fig.2A          Fig.2B

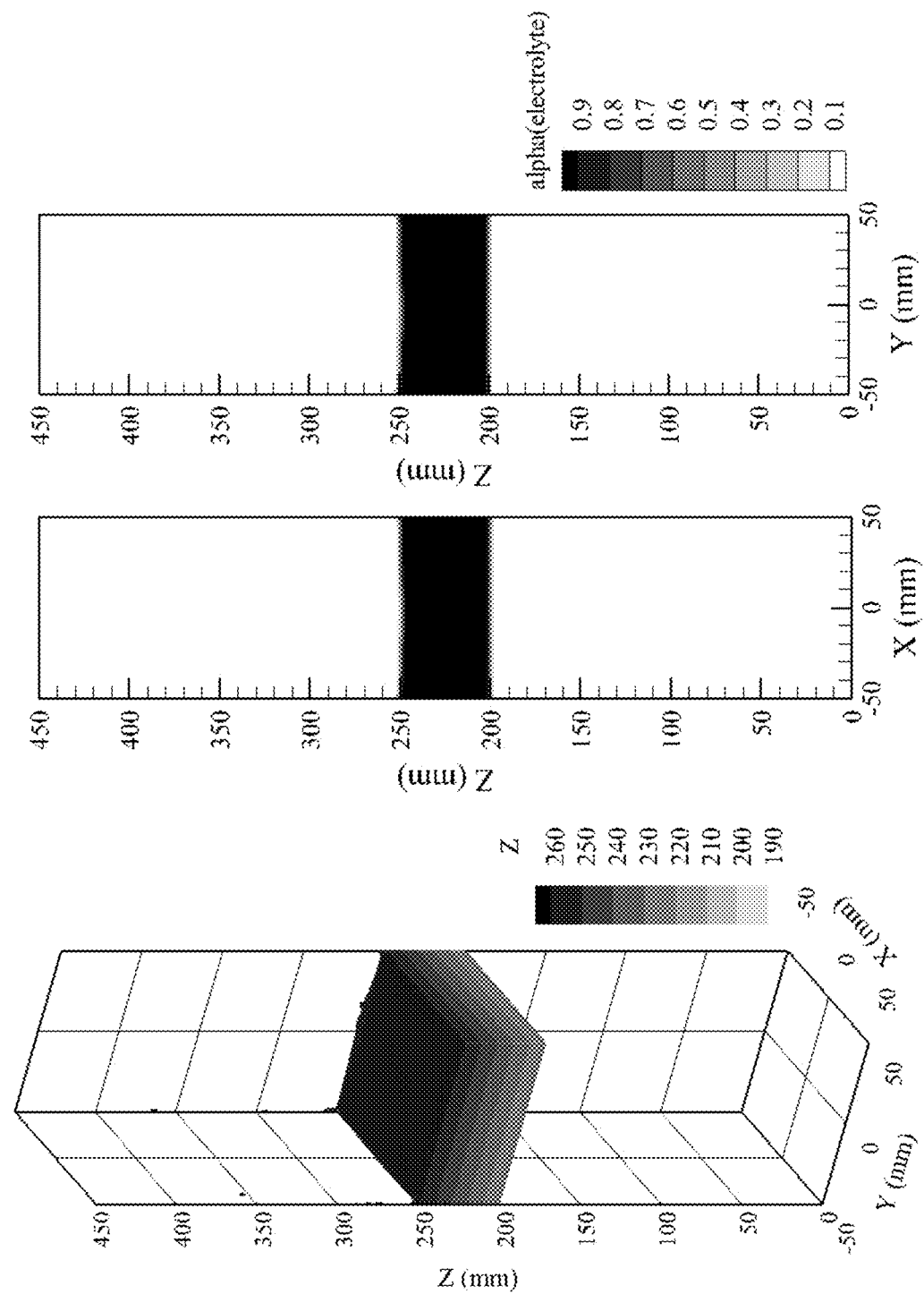

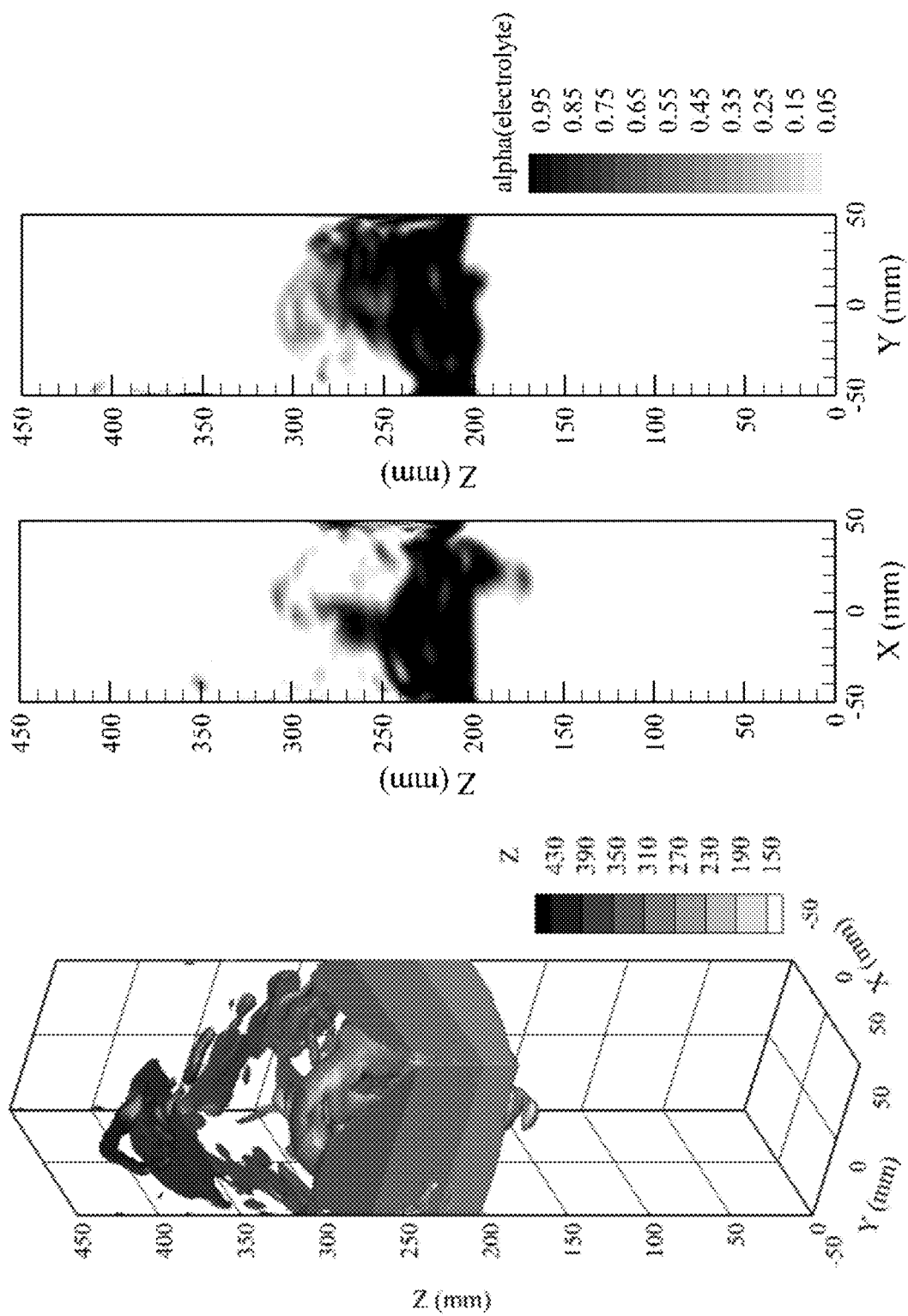

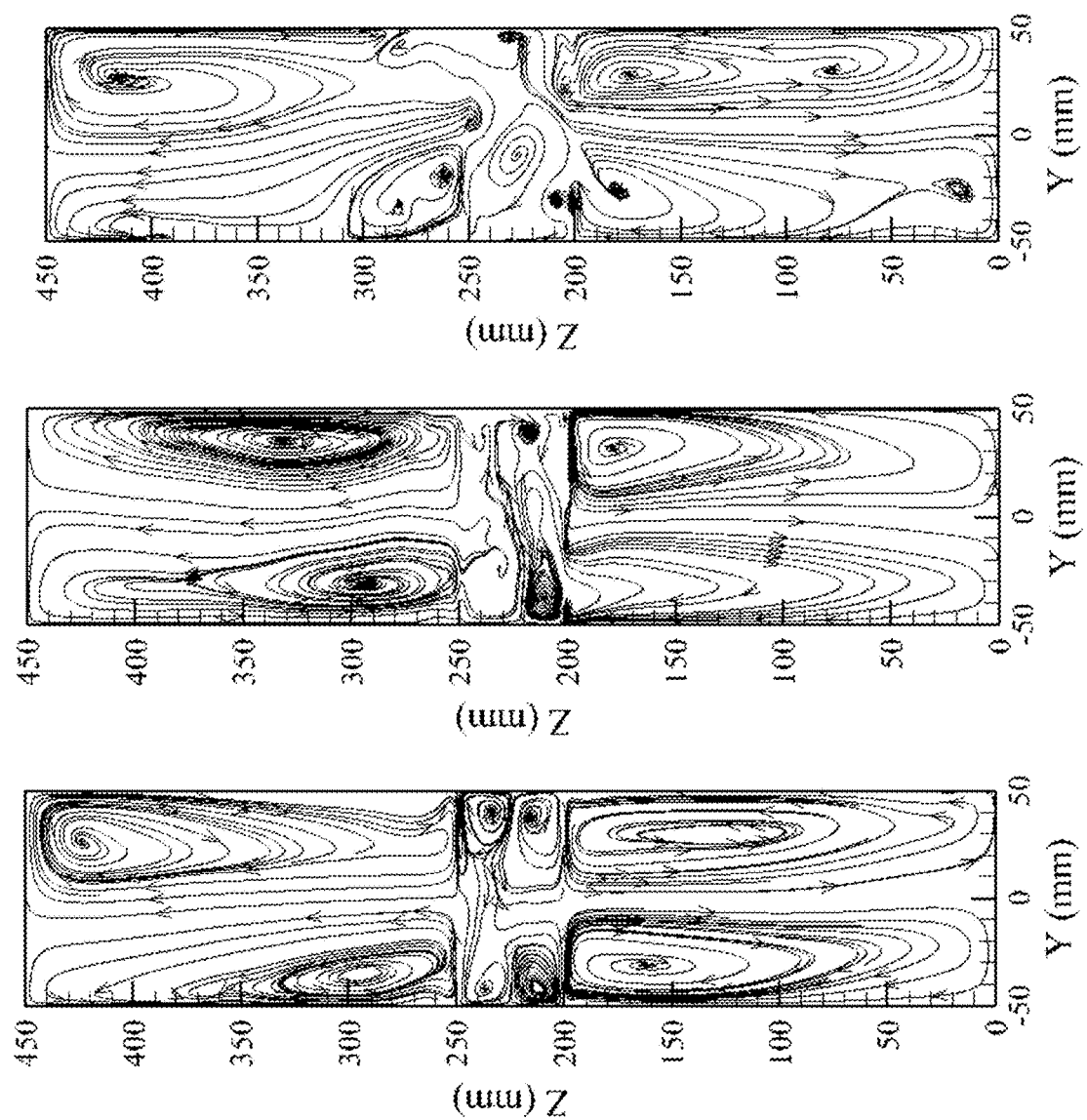

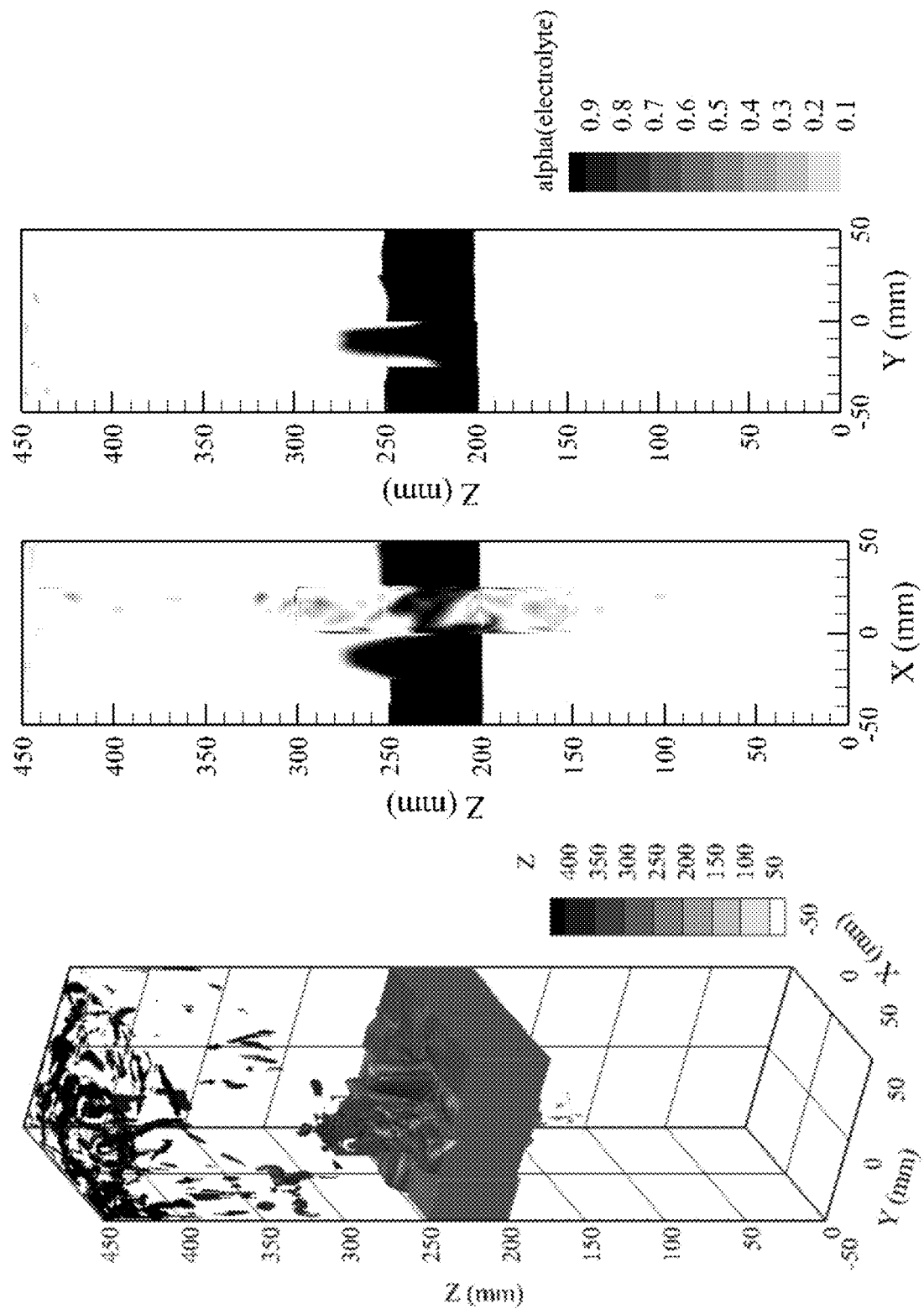

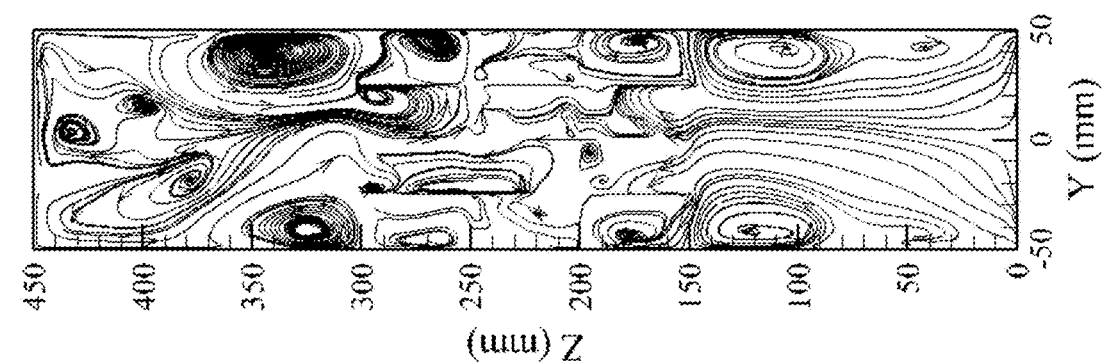
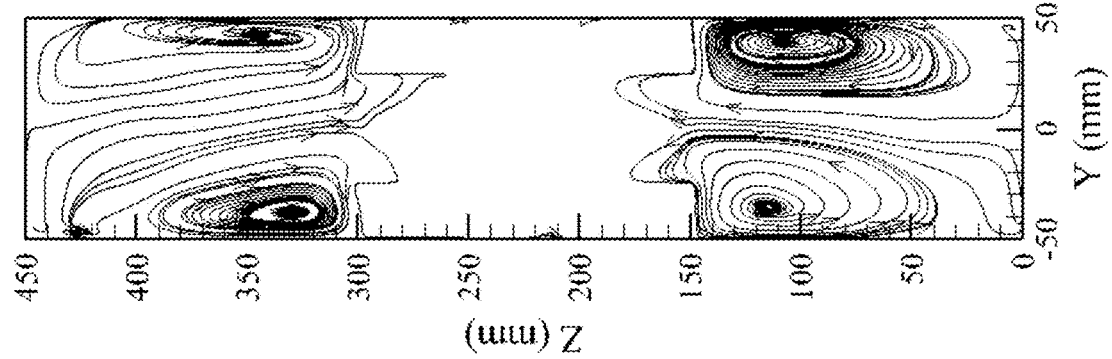

SQUARE SECTION LIQUID METAL BATTERIES WITH GRID DEVICE TO SUPPRESS INSTABILITIES OF FLUIDS

TECHNICAL FIELD

The present invention belongs to the field of electrochemical battery energy storage, specifically relates to square section liquid metal batteries with grid device to suppress instabilities of fluids.

BACKGROUND

Energy, sources and environment compose the most important three elements for the development and progress of human society. With the fast development of economy, the consumption of fossil fuel, which is the main source of world energy, is increasing yearly. This directly leads to the increasing of $CO_2$ in atmosphere, further causes warmer earth, environmental degradation and more natural disasters, etc. Therefore, many countries are developing and using new clean renewable energies, such as, the windy energy, the tidal energy, the solar energy, and biomass energy, etc. According to the BP World Energy Statistics of 2017, about 60% of increment of world primary energy consumption attributed to natural gas and renewable energy, the ratio of coal consumption in primary energy reduced to 27.6%, which is the lowest level since 2004. While, the electricity from renewable energy increased by a ratio of 17%, more than half of it is from windy energy and more than one-third of it from solar energy. However, there exist serious defects like bad stability and large wasting for these clean renewable energies. For example, the electricity from wind turbine is fluctuating and unstable due to the speed change of wind; due to the changes of season, day-and-night and weather etc. even in the same area, the electricity from solar energy can still be very different as the differences of light intensities and time. The fluctuation of electricity from renewable energies will affect the stability of electrical grid, and also leads to the time difference and electrical energy waste between producers and demanders. For any new clean energy to be widely accepted and applied, it is important to supply energy (electricity etc.) stably and persistently. Therefore, it is necessary to introduce an energy storage system between electricity customers and electricity producers from windy, solar, and tidal energy for ensuring the stable energy supply. The energy storage system cannot only balance the energy supply and demand well, but also avoid great fluctuation in electrical grid. Besides, the capacity of energy storage system or equipment will directly affect the development of renewable energy sources.

Up to now, there are many kinds of energy storage systems or equipment, such as, the electrical energy storage, the superconducting magnetic energy storage (SMES), the electrochemical energy storage (lithium ion battery, sodium-sulfur battery, flow battery, etc.). However, their present defects prevent their applications to bridge the renewable energy and electrical grids. For electrical energy storage, its energy density is even lower than that of normal battery, which directly results in lower ability of continuously cruising. The SMES has very high cost and poor reliability. For existing electrochemical energy storages, batteries made of different materials show different disadvantages. For instance, the energy and power densities of lithium ion battery are high enough, but the cost is so high (>5000 Yuan/kWh), which is far from the wide-accepted marked price (<1500 Yuan/kWh). Of course, in China, the cost of energy storage by employing Lithium ion battery decreasing yearly, but its price is still too high due to the key materials and key technologies. Even the most mature and low-cost sodium-sulfur battery and vanadium redox flow battery, their costs are still greater than 3000 Yuan/kWh and 5000 Yuan/kWh respectively. Others, like water-pumping (hydro) energy storage and compressed gas energy storage, are easily limited by the environment conditions and also have high cost, so, they are also difficult to be promoted. Therefore, in 2007, Prof. D. R. Sadoway from Massachusetts Institute of Technology proposed the liquid metal battery which can be used as electrical energy storage for large scale electrical grid.

The materials of negative and positive electrodes are liquid metals when LMBs are running, and a liquid layer between negative and positive electrodes is molten salt electrolyte. In LMBs, the chosen corresponding materials of the three liquid layers (negative electrode, electrolyte, and positive electrode) have different increased densities from top to bottom. The three layered materials are mutual immiscible, and they are stratified automatically due to the density differences. The schematic is shown in FIG. 1. The running process can be described as follow. During discharging process, electrons move to the positive electrode through external circuit, and the negative electrode metal A is electrochemically oxidized into $A^+$ by losing electrons simultaneously. Then $A^+$ will go through the molten salt electrolyte layer and move to the positive electrode metal B, finally form a kind of A-B alloy. The more $A^+$ in the positive electrode, the thicker the A-B alloy, which implies a larger capacity of discharging there is. In contrast, during charging period, electrons move to the negative electrode from the positive electrode through external circuit, and the alloy A-B will be electrochemically deoxidized into $A^+$, and then $A^+$ will go through the molten salt electrolyte and move back to the negative electrode, finally combine into metal A with electrons. The more $A^+$ gather in the negative electrode, the more metal A will be formed, which implies a larger capacity of charging there is. This is the ion reaction process during discharging/charging process in LMBs.

The chemical reaction equations are as follow:

In discharging process:

Positive electrode: $A^{Z+}+ze^-+B \rightarrow A-B$

Negative electrode: $A \rightarrow A^{z+}+ze^-$

In charging process:

Positive electrode: $A-B \rightarrow A^{z+}+ze^-+B$

Negative electrode: $A^{z+}+ze^- \rightarrow A$

The total chemical reaction formula in LMBs is: $A+B \rightleftharpoons A-B$

Special design and structure make the LMBs have good ability of energy storage, and the cost will be reduced as scales enlarge. Firstly, the usage of liquid electrodes can remarkably eliminate the inert dynamics of solid electrodes, and the very high conductivity of liquid molten salt can greatly enhance the movement of ions within the electrolyte. These can make LMBs still maintain high energy efficiency even they are charging/discharging at an electrical current density of several $A/cm^2$. Secondly, because both electrodes of LMBs are liquids, those problems, which limit the service life and safety performance, of electrodes' deformation and dendritic growth can be avoided. In other words, LMBs have a longer life than traditional batteries. Thirdly, the liquid molten salt separates the negative and the positive liquid metal electrode instead of using special membranes, and this will be beneficial to reduce cost, and be easy to implement volume enlargement and to manufacture. Finally, separating membrane is no longer a limitation, and at the same time, there are wide supplements of electrodes and electrolyte materials at low prices, So LMBs are the best choice to meet the predicted low price on energy storage at large scale. Besides, the higher ratio of charging/discharging and the scalability make LMBs have functions of energy and power, and have extensive prospects.

SUMMARY OF THE INVENTION

The present invention proposes square section liquid metal batteries with grid device to suppress instabilities of fluids. The most important innovation lies to propose a newly designed structure—the grid device. The grid device can suppress many different kinds of instabilities within the square section LMBs including, the sloshing instability of interfaces, the Tayler instability, the Rayleigh-Bénard instability, and the electrical current vortex flows in the liquid negative electrode. The basic principle is to use the grid device to effectively change the distributions of magnetic field and flow field, and further to suppress multi-instabilities within LMBs, hence to avoid short circuit. Simultaneously, the charging efficiency can be improved remarkably due to the greatly improved critical electric potential or current.

Currently, either most of LMBs' models or productions comprise only two terms of liquid layer (the electrolyte and the positive electrode, or the negative and the positive electrodes), the left term is solid, or the LMBs themselves are just small-scaled. The fundamental reason is that, if all three terms, say, the negative electrode, the positive electrode and the electrolyte, are liquids, the instabilities within large-scaled LMBs cannot be controlled effectively. If the three terms are all liquids, they are stratified into three layers automatically by gravitation due to the mutual immiscibility and different densities. The bottom layer is the positive material with the biggest density, the middle layer is the electrolyte with the moderate density, and the top layer is the negative material with the smallest density. The middle electrolyte materials can be chosen from some materials, which are corresponding to the materials of the negative electrode, such as, single of or multi-mixed of halogen inorganic salts, sulfate, carbonate, nitrate, or other inorganic salts. The middle electrolyte materials also can be single of or multi-mixed of inorganic salts, which are corresponding to the positive material element or other inactive elements. For this kind of LMBs composed of three layers of liquid, an electrical current collector is mounted on the negative and the positive electrode, respectively. The collectors are used to link the inner liquid electrodes and external wires or cables, hence to complete the current loop between electrical source/load and the liquids within LMBs. During the charging or discharging process, the current loop easily suffers short circuit due to the instabilities of fluids, especially for larger-scaled LMBs. Therefore, we creatively propose to insert a special grid device composed of partitions into LMBs to suppress flow instabilities by changing the distributions of magnetic field and flow field.

To reach above targets, the present invention adopts the following technical solution:

Square section liquid metal batteries (LMBs) with grid device to suppress instabilities of fluids, as shown in FIG. 2, the embodiments of LMBs comprise, a shell 1, an electrical current collector of negative electrode 2, a negative material 3, metallic nets or metallic plates 4, a grid device 5, an electrolyte 6, a positive material 7, rectangular holes 8 on partitions, an electrical current collector of positive electrode 9. The mentioned positive material 7, electrolyte 6 and negative material 3 are filled and stratified in the shell 1 from bottom to top. The positive material 7 and the negative material 3 are liquid metals or alloys with high temperature; the electrolyte 6 is liquid molten salt with high temperature. The sequence of densities of three layers of liquid within LMBs is as follow, positive material 7>electrolyte 6>negative material 3. Two electrical current collectors 2 and 9 are linked with the negative material 3 and the positive material 7 respectively from outside of LMBs. The grid device 5 within the shell 1 is composed of partitions crossing each other, and the grid device 5 passes through the negative material 3, the electrolyte 6 vertically in sequence, and extends to inside of the positive material 7. There is no gap between the top end of the grid device 5 and the negative electrical current collector 2, so that the grid device 5 can avoid promoting movement of the negative material 3 when electrical current density changes. The bottom end of the grid device 5 is lower than the maximum displacement of the electrolyte 6 during charging process, and it extends to the $2/3$-$1/2$ of initial height of the positive material 7 to insure the instabilities in LMBs can always be suppressed during the whole charging/discharging process. The core of the partitions of the grid device 5 is the metallic net or the metallic plate 4, and the rectangular holes 8 are made on the partitions of the grid device 5. The vertical height of the rectangular holes 8 is larger than the maximum displacement of the electrolyte 6 during charging/discharging process to keep each interface (one is between the negative material and the electrolyte, the other one is between the electrolyte and the positive material) of two terms at the same horizontal level in each child zone (grid) separated by partitions. This design can also be used to prevent the formation of a big singleen closed induced magnetic loop in the whole LMB or the formation of a medium-sized enclosed induced magnetic field loop through some rectangular holes.

To emphasize that, the grid device 5 is composed of partitions which are crossing each other, and the partitions are assembled to form a uniform grid in horizontal sections of LMBs.

There is no space between the grid device 5 and side walls of LMBs, which means the partitions directly touch the inner walls of LMBs. The top end of the grid device 5 is embedded in or directly touches the negative electrical current collector 2. The bottom end of the grid device 5 is lower than the location where the electrolyte 6 can mostly reach, and extends to the $2/3$-$1/2$ of initial height of the positive material 7. The thickness of partitions of the grid device 5 is $1/60$-$1/100$ of width of the shell 1, and the material of the grid device 5 should be electrically insulated, magnetically insulated and corrosion resistant.

In the domain where there is the grid device 5, the left fluid flow area (the area of total section minus the gross area of the grid device 5 on that horizontal section) at least occupies $\sqrt{2}/2$ of total section area of LMBs in horizontal sections.

The regulations for the rectangular holes 8 on partitions are: firstly, the rectangular holes 8 should be set at some special positions on partitions, right next to the inner walls of LMBs or right next to the junctions of any two partitions; secondly, no magnetic induction line continually passes through four or more rectangular holes to form an enclosed loop; thirdly, there is only one rectangular hole 8 on each side edge (except the inside walls of LMBs) of grid, which is enclosed by partitions or by partitions and inside wall/walls of LMBs; finally, the rectangular holes 8 are thin and long, their widths (smaller scale, length is the larger scale) shouldn't be greater than $1/5$ of the corresponding width of that side edge of grid, which is enclosed by partitions or by partitions and inside wall/walls of LMBs, and the lower limit of widths should be the minimal size that can guarantee the smoothly flowing through by liquids (liquid metals or electrolyte), e.g., 4 mm.

In these square section LMBs, the top end of the rectangular holes 8 is higher than the maximum displacement of the electrolyte 6 when it moves up during discharging process, the bottom end of the rectangular holes 8 should be lower than the maximum displacement of the electrolyte 6 when it moves down during charging process, and the bottom end of the rectangular holes 8 will extend to the $2/3$-$7/12$ of initial height of the positive material 7. When the bottom end of the grid device 5 only extends to the $2/3$ of initial height of the positive material 7, the bottom end of the rectangular holes 8 and the bottom end of the grid device 5 will be at the same horizontal level.

The thickness (or height in vertical direction) of the electrolyte 6 should be $1/9$-$1/40$ of the total height of the shell 1. Of course, the minimum thickness of the electrolyte 6 is related to the pair number of partitions for a certain LMB. The larger the pair number of partitions which compose the grid device 5 is, the smaller the thickness of the electrolyte 6 can be used, under the permission of instabilities suppressing.

The materials of the negative and the positive electrical current collectors 2 and 9 may be copper, stainless steel, or titanium alloy, etc.

The materials of the grid device 5 composed of partitions may be ceramic plate which contains a metallic net or a metallic plate 4 inside.

The shell 1 should be electrically insulated, high temperature resistant and corrosion resistant.

The shell 1 is preferable a ceramic square tube with the metallic nets or the metallic plates 4 as the core. Grooves are made on the inner walls to fix partitions where the grid device 5 is mounted.

The negative material 3 can be chosen from columns IA, IIA, IIIA, IVA and IIB of periodic table of elements, e.g., one or a mixture of Ba, Ca, Cs, K, Li, Mg, Na, Rb and Sr, or alloy of them.

The positive material 7 can be chosen from columns VIIIB, IB, IIB, IIIA, IVA, VA and VIA of periodic table of elements, e.g., one or a mixture of Al, Bi, Cd, Ga, Hg, In, Pb, Sb, Sn, Te, Ti and Zn, or alloy of them.

The electrolyte 6 materials can be chosen from some materials, which are corresponding to the materials of the negative electrode, such as, single of or multi-mixed of halogen inorganic salts, sulfate, carbonate, nitrate, or other inorganic salts. The middle electrolyte materials also can be single of or multi-mixed of inorganic salts which are corresponding to the positive material element or other inactive elements.

In this invention, in order to prove the grid device's function of suppressing multi-instabilities of fluids, numerical simulations are carried out by applying voltage on both the positive and the negative electrodes to model the charging process of LMBs. The given voltage can be easily converted into electrical current according to Ohm's law. Without the grid device in LMBs, we can find the critical applied voltage (corresponding to the critical electrical current during charging process) when instabilities happen within LMBs by increasing the applied voltage gradually. The so called "critical voltage" stands for the voltage corresponding to the critical current when LMBs loss stability (instabilities happen) during charging process.

There usually exist horizontal electrical current components (normal to the vertical direction or axial direction of LMBs) on the interfaces of the electrolyte 6 with both electrodes, since the electrical conductivity of the electrolyte 6 is smaller than those of the positive and the negative materials by 2-3 orders of magnitude. It is also because the electrical conductivity of the electrolyte 6 is smaller than those of the positive and the negative materials, more Joule heat will be generated within the electrolyte layer and further cause the Rayleigh-Bénard thermal convection (one kind of thermal convection instability). The cross production of the induced magnetic field by the applied current and horizontal current components will lead to Lorentz force. If the applied voltage/current is less than the critical voltage/current, the Lorentz force is not large enough to overcome the viscous force on the interfaces, and then LMBs will work well. Otherwise, if the applied voltage/current is larger than the critical voltage/current, fluctuations first appear on the upper interface (the interface between the electrolyte and the negative electrode), and these fluctuations will rotate around axis of LMBs at the same time. The appearance of these fluctuations will destroy the uniformity of thickness of the electrolyte layer. Even worse, the thinner location (area) of the electrolyte layer 6 will cause higher current density, the thicker location (area) will cause lower current density. This situation can self-accelerate till short circuit happens.

The present invention has the following advantageous effects:

(1) The top end of the grid device is directly embedded into or directly connect the negative electrical current collector, this will homogenize electrical current both in the negative electrical current collector and in those area where immediately below the negative electrical current collector, and hence to suppress the electro-vortex flow within the negative liquid metal. The designed thickness of the electrical current collector is relatively small (especially for those that the top end of the grid device is directly embedded into the negative electrical current collector), therefore the electrical current in the collector will be almost perpendicular to the axis and produces local vertical magnetic field, which is good for suppressing the Tayler instability within liquid metal.

(2) Usually, the bottom layer liquid metal (the positive material 7) has the biggest density, which flows most slowly or almost steady. This will lead to the formation of solid intermetallic compounds, and these compounds may arch or stick on the inner wall/walls of LMBs, then result in short circuit within LMBs. The bottom end of the grid device 5 only extends to the $2/3$-$1/2$ of initial height of the positive material 7, therefore, some space is retained between the bottom end of the grid device and the positive electrical current collector 9 to allow formation of electro-vortex flow, further to enhance the flow of bottom liquid metal. The moving bottom liquid metal can effectively suppress formation of the solid intermetallic compounds.

(3) Due to the imbedding of the grid device 5, the characteristic length scale of the electrolyte layer 6 becomes several times smaller than before, which is beneficial to suppress the Rayleigh-Bénard convection.

(4) The electrical current of charging/discharging and its self-induced toroidal magnetic field will produce the inherent Tayler instability in LMBs. The normal way to increase the charging/discharging efficiency of LMBs is to use larger charging/discharging electrical current. While, the larger the electrical current is, the higher the induced magnetic field is. Lots of investigations imply that, for those flat type (large section area but shorter) of LMBs, which are not vulnerable to the Tayler instability but their capacities are also smaller; for fine-high type (smaller horizontal section area but higher) of LMBs, which are vulnerable to the Tayler instability but their capacities are larger. The research also imply that, for the same current intensity, the larger the effective radius of LMBs is, the weaker the toroidal magnetic field is, thus it is not easy for the onset of Tayler instability. In contrast, the smaller the effective radius is, the stronger the magnetic field is, thus it is easier for the onset of Tayler instability. According to Refs. [G. Rüdiger, M. Schultz, M. Gellert, Astronomical Notes Astronomische Nachrichten, 10, 2011; N. Weber, V. Galindo, F. Stefani, T. Weier, New Journal of Physics, 15, 043034, 2013], the critical Ha number for the onset of Tayler instability is Ha=$B_\phi(R)R\sqrt{\sigma/\rho v}$ and has a value of 20 in columnar system with toroidal magnetic field. Since $B_\phi(R)$ is function of radius, then one can get [N. Weber, V. Galindo, F. Stefani, T. Weier, Journal of Power Sources, 265, 2014]: Ha=$I\mu_0\sqrt{\sigma/\rho v}/2\pi$, where, I, $\mu_0$, $\sigma$, $\rho$. v are the current intensity, the vacuum permeability, the electrical conductivity, the density and the kinematic viscosity. In the present invention, the grid device will separate the square section into n child parts uniformly (n is the total number of separated parts of section by the grid device together with the inner walls of LMBs). Therefore, the equivalent radius of each part becomes only $1/\sqrt{n}$ of the equivalent radius of total section, and the current intensity of each part $I_i$ is reduced to 1/n of original $I_0$. Then the induced magnetic field will also reduce to $1/\sqrt{n}$ of the original one. For instance, if the grid device comprises three pairs of partitions, the magnetic field in each part will be approximately ¼ of the original one. Certainly, the introduction of grid device can effectively suppress the Tayler instability within LMBs.

BRIEF DESCRIPTION OF DRAWINGS

FIG. 1A is the schematic diagram of discharging process of LMBs.

FIG. 1B is the schematic diagram of charging process of LMBs.

FIG. 2A is the general structural schematic diagram (A-A sectional view) of one LMB when the grid device with one pair of partitions is mounted.

FIG. 2B is the B-B sectional view of FIG. 2A.

FIG. 5A shows the 3D shape of the electrolyte layer when the applied voltage is 64V without grid device.

FIG. 5B shows the 2D shape of the electrolyte layer on a XOZ (y=0) plane when the applied voltage is 64V without grid device.

FIG. 5C shows the 2D shape of the electrolyte layer on a YOZ (x=0) plane when the applied voltage is 64V without grid device.

FIG. 5D shows the 3D shape of the electrolyte layer when the applied voltage is 65V without grid device.

FIG. 5E shows the 2D shape of the electrolyte layer on a XOZ (y=0) plane when the applied voltage is 65V without grid device.

FIG. 5F shows the 2D shape of the electrolyte layer on a YOZ (x=0) plane when the applied voltage is 65V without grid device.

FIGS. 6A-6C show the streamlines on a YOZ (x=0) plane within the LMB without grid device, AE=64V, BE=65V, CE=70V.

FIG. 7D shows the 3D shape of the electrolyte layer when the applied voltage is 142.5V with grid device comprising three pairs of partitions.

FIG. 7E shows the 2D shape of the electrolyte layer on a XOZ (y=12.5) plane when the applied voltage is 142.5V with grid device comprising three pairs of partitions.

FIG. 7F shows the 2D shape of the electrolyte layer on a YOZ (x=12.5) plane when the applied voltage is 142.5V with grid device comprising three pairs of partitions.

FIGS. 8A-8B show the streamlines on a YOZ plane within the LMB with grid device comprising three pairs of partitions, (a) E=140V, (b) E=142.5V.

In FIGS. 2A-2B: the shell 1, the electrical current collector of the negative electrode 2, the negative material 3, the metallic nets or the metallic plates 4, the grid device 5, the electrolyte 6, the positive material 7, the rectangular holes 8 on partitions, the electrical current collector of the positive electrode 9.

In captions of FIGS. 6A-6C and 8A-8B, E is the imposed electrical voltage in the numerical simulations.

DETAILED DESCRIPTION

The following are the detailed description of present invention associated with drawings.

Figure 3A:
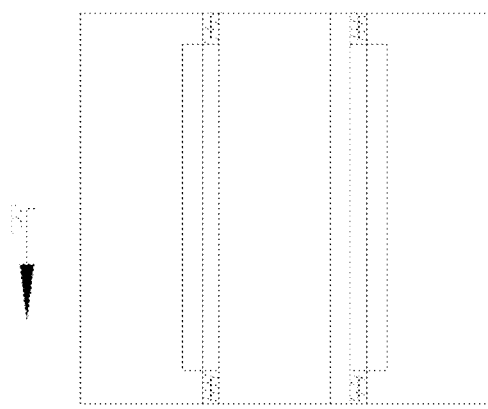
FIG. 3A is the structural schematic diagram (A-A sectional view) of the grid device when the gird device with two pairs of partitions is mounted.

The most important innovations of present invention lie in that: the capacity of LMBs is directly related to the structure design and the shape of horizontal section. For instance, the capacity of fine-high type LMBs are larger than that of plate type LMBs for cylindrical LMBs with the same volume. All substances within LMBs are liquid and automatically stratify into three layers due to gravity: the top, the middle, and the bottom layers are the negative electrode 3, the electrolyte 6, and the positive electrode 7, correspondingly. This special strategy of design makes LMBs have the characteristics of simple structures, easily assembling, low cost and long life. However, these typical LMBs have their inherent disadvantages, like, LMBs can only work in stationary environment; the electrolyte 6 will move up and down during charging/discharging processes, and this may cause sloshing instability of interfaces due to surface tension and electro-magnetic force, and further lead to short circuit; since the viscosities (especially the positive material 7 has higher viscosity) and the wettability (relative to solid) of fluids are different, the liquid metals may stick on to the inner walls of LMBs when the electrolyte moves up and down, and further result in short circuit; within the charging/discharging cycles, the solid intermetallic compounds may appear on the interface between the electrolyte 6 and the positive material 7, and the compounds may also stick on the inner walls or even arch, then result in short circuit; usually LMBs work at an environment of high temperature (>250° C.), and the electrolyte will produce lots of Joule heat, therefore the Rayleigh-Bénard convection may happen due to temperature differences; there is a big difference between cross-sectional area of external cable and interface between electrical current collector (thinner) and liquid electrode, this will produce non-uniform distribution of electrical current density in liquid metal, resultantly leads to electro-vortex flow and further short circuit; when the charging/discharging current intensity is greater than the critical one (usually up to thousands of amperes or even more, depending on the volume, the materials, and the thickness of the electrolyte), there exists Tayler instability (also called sausage instability) which is a kind of kink-type instability. Tayler instability, which can also lead to short circuit, are one kind of the main and inherent instabilities in LMBs. In order to overcome these disadvantages of LMBs, a completely new structure, i.e., the grid device is designed in the present invention. There is no space between the grid device 5 and the negative electrical current collector 2, or the grid device 5 is directly embedded into the collector. This design can uniform the electrical current in the negative liquid electrode 3 and further suppress electro-vortex flow in this domain. On the other hand, the grid device 5 doesn't extend to the positive current collector 9, whilst due to the thickness of partitions, the current density near the positive electric current collector 9 within the positive liquid metal 7 is inhomogeneous. This will improve the appearing of electro-vortex flow in the positive material 7, further inhibit or slow the formation of the solid intermetallic compounds. The rectangular holes 8 in vertical direction on partitions can always assure each interface (one is between the negative material 3 and the electrolyte 6, the other is between the electrolyte 6 and the positive material 7) of two terms locates at the same horizontal level when LMBs work normally. For avoiding short circuit due to adhesion of fluid on partitions, the top end of the rectangular holes 8 should be higher than the location where the electrolyte 6 can reach during discharging process of LMBs, while the bottom end of the rectangular holes 8 should be lower than the location where the electrolyte 6 can reach during charging process, and extend to ⅔-7/12 of initial height of the positive material 7. The lower limit of the rectangular holes' 8 width should be the minimal size that can assure the electrolyte 6 and liquid metals can smoothly flow through the rectangular holes (e.g., 4 mm), but the width shouldn't be greater than ⅕ of the corresponding width of that side edge of grid, which is enclosed by partitions or by partitions and inside wall/walls of LMBs. Besides, a special design is necessary for convenience of manufacturing and assembling when the pair number of partitions is larger than one. When the pair number is even, the structure of the grid device should be centrosymmetric and the grid device should be mounted by splicing because of the limitation of the rectangular holes distribution, e.g., for two pairs of partitions, two-stage splicing is used as shown in FIG. 3. While, when the pair number is odd, the structure of the grid device can be axisymmetric or centrosymmetric and the grid device should also be mounted by splicing because of the limitation of the rectangular holes 8 distribution, e.g., for three pairs of partitions, three-stage splicing is used as shown in FIG. 4.

EXAMPLES

Example 1

Square section LMBs with a grid device to suppress the instabilities of fluids, the embodiments of LMBs comprise, a shell 1, an electrical current collector of negative electrode 2, a negative material 3, metallic nets or metallic plates 4, a grid device 5, an electrolyte 6, a positive material 7, rectangular holes 8 on partitions, an electrical current collector of positive electrode 9. The mentioned positive material 7, electrolyte 6 and negative material 3 are filled in the shell 1 and automatically stratified from bottom to top. The positive material 7 and the negative material 3 are liquid metals or alloys, the electrolyte 6 is liquid molten salt with high temperature. The densities sequence of the three-layer liquids within LMBs is as follow, positive material 7>electrolyte 6>negative material 3. Two electrical current collectors 2 and 9 are linked with the negative material 3 and the positive material 7 respectively from outside of LMBs. The grid device 5 within the shell 1 is composed of partitions crossing each other, and the grid device 5 passes through the negative material 3, the electrolyte 6 vertically in sequence, and extends to inside of the positive material 7. There is no gap between the top end of the grid device 5 and the negative electrical current collector 2, so that the grid device 5 can avoid promoting movement of the negative material 3 when electrical current density changes. The bottom end of the grid device 5 is lower than the maximum displacement of the electrolyte 6 during charging process, but it doesn't extend to the positive current collector 9 to assure that the grid device 5 can always suppress instabilities in LMBs during the whole charging/discharging cycles. The core of the partitions of the grid device 5 has to be the metallic nets or the metallic plates 4, and the rectangular holes 8 are made on the partitions of the gird device 5. The vertical height of the rectangular holes 8 is larger than the maximum displacement of the electrolyte 6 during charging/discharging process. The lower limit of the rectangular holes' 8 width should be the minimal size that can assure the electrolyte and liquid metals can smoothly flow through the rectangular holes 8 (e.g., 4 mm), but the width shouldn't be greater than ⅕ of the corresponding width of that side edge of grid, which is enclosed by partitions or by partitions and inside wall/walls of LMBs, to keep each interface (one is between the negative material 3 and the electrolyte 6, the other is between the electrolyte 6 and the positive material 7) of two terms at the same horizontal level in each child zone separated by partitions. This design can also prevent the formation of a big single enclosed induced magnetic loop in the whole LMB or the formation of a medium-sized enclosed induced magnetic field loop through some rectangular holes.

In example 1, the grid device 5 in LMBs comprises one pair of partitions, as shown in FIG. 2B. The partitions are mounted crossing each other perpendicularly. In this case, we say the grid device 5 comprises one pair of partitions.

The method of setting up the rectangular holes 8 in this case is: for one pair of partitions, the rectangular holes 8 should be made as shown in FIG. 2B. The rectangular holes 8 are just made at the location where two partitions are crossing because the induced magnetic field is weakest at the symmetric center of the LMBs. These rectangular holes 8 can guarantee each interface (one is between the negative material 3 and the electrolyte 6, the other is between the electrolyte 6 and the positive material 7) of two terms at the same horizontal level in each child zone separated by partitions. Besides, the vertical height of the rectangular holes 8 should be larger than the maximum displacement of the electrolyte 6 during charging/discharging process to prevent short circuit due to liquid metals sticking on partitions, and the rectangular holes' 8 width need be large enough to assure the electrolyte 6, the liquid metals 3 and 7 can smoothly flow through the rectangular holes 8 (e.g., 4 mm), but the width shouldn't be greater than ⅕ of the corresponding width of that side edge of grid, which is enclosed by partitions or by partitions and inside wall/walls of LMBs.

Example 2

Figure 3B:
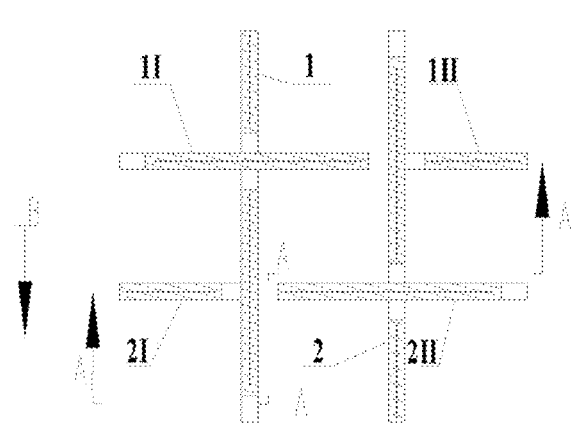
FIG. 3B is the B-B sectional view of FIG. 3A.
Figure 4A:
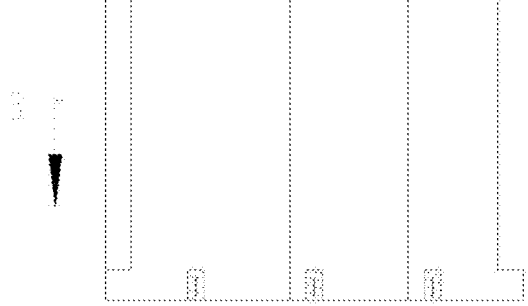
FIG. 4A is the structural schematic diagram (A-A sectional view) of the grid device when the gird device with three pairs of partitions is mounted.

The most structures are the same as in example 1 except that the grid device 5 in LMBs comprises two pairs of partitions, as shown in FIG. 3B. In example 2, partitions 1I and 1II are coplanar, 2I and 2II are coplanar (one pair is composed of partitions 1, 1I and 1II; the other pair is composed of 2, 2I and 2II). This time, we say the grid device 5 comprises two pairs of partitions.

The method of setting up the rectangular holes 8 in this case is: FIG. 3B depicts the detail assembling of the rectangular holes 8 when the pair number of partitions increases to two. In order to guarantee each interface (one is between the negative material 3 and the electrolyte 6, the other is between the electrolyte 6 and the positive material 7) of two terms at the same horizontal level in each child zone separated by partitions, and also to prevent the formation of a big single enclosed induced magnetic field loop in the whole LMB or the formation of a medium-sized enclosed induced magnetic field loop through some rectangular holes (ideally, the enclosed induced magnetic field loop should only be formed within each separated grid), the rectangular holes 8 should be set at special positions on partitions, right next to the inner walls of LMBs or right next to the junctions of any two partitions. In this way, no magnetic induction line continually passes through four or more rectangular holes to form an enclosed loop. Finally, there is only one rectangular hole on each side edge (except the inside walls of LMBs) of grid, which is enclosed by partitions or by partitions and inside wall/walls of LMBs. For convenience of manufacturing, the grid device 5 is designed center-symmetrically and manufactured in the method of two-stage splicing.

Example 3

Figure 4B:
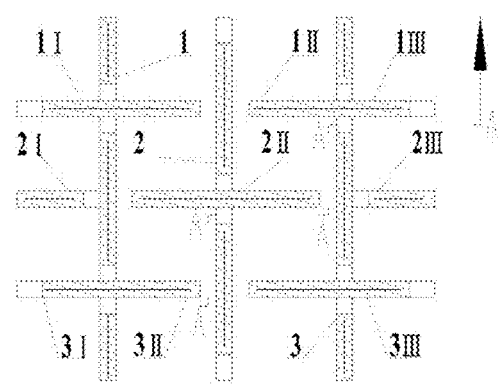
FIG. 4B is the B-B sectional view of FIG. 4A.

The most structures are the same as in example 1 except that the grid device 5 in LMBs comprises three pairs of partitions as shown in FIG. 4B. In example 3, partitions 1I, 1II and 1III are coplanar; 2I, 2II and 2III are coplanar; 3I, 3II and 3III are coplanar (the first pair is composed of partitions 1, 1I, 1II and 1III; the second pair is composed of 2, 2I, 2II and 2III; the third pair is composed of 3, 3I, 3II and 3III). This time, we say the grid device 5 comprises three pairs of partitions.

The method of setting up the rectangular holes 8 in this case is: FIG. 4B depicts the detail assembling of the rectangular holes 8 when the pair number of partitions increases to three. Similarly, in order to guarantee each interface (one is between the negative material 3 and the electrolyte 6, the other is between the electrolyte 6 and the positive material 7) of two terms at the same horizontal level in each child zone separated by partitions, and also to prevent the formation of a big single enclosed induced magnetic field loop in the whole LMB or the formation of a medium-sized enclosed induced magnetic field loop through some rectangular holes (ideally, the enclosed magnetic field loop should only be formed within each separated grid), the rectangular holes 8 should be set at special positions on partitions, right next to the inner walls of LMBs or right next to the junctions of any two partitions. In this way, no magnetic induction line continually passes through four or more rectangular holes to form an enclosed loop. Finally, there is only one rectangular hole on each side edge (except the inside walls of LMBs) of grid, which is enclosed by partitions or by partitions and inside wall/walls of LMBs. For convenience of manufacturing, the grid device 5 is designed in the method of three-stage splicing, and the whole grid device is axis-symmetrically or center-symmetrically.

Example 4

In order to verify the effectiveness of this proposed new grid device for suppressing multi-instabilities in LMBs, some numerical experiments are conducted in example 4. The physical model for numerical simulations is obtained by simplifying the real physical problems. The magnetic permeability of the negative material 3, the electrolyte 6 and the positive material 7 are the same and assumed as the vacuum magnetic permeability $\mu_0$; the thickness of all partitions is neglected; the chemical reactions within LMB are also ignored. The detailed description of physical model is as follow:

1. The scales of a square section LMB have the values of 100 mm×100 mm×450 mm in X×Y×Z dimensions (square section in horizontal XOY plane and vertical height in Z). Three liquid layers are Li|LiCl—KCl|Pb—Bi (Table 1 lists the properties).

2. There is no space between the side edges of the grid device 5 and the inner walls of the LMB. The top end of the grid device 5 extends to ¼ (the initial point is on the interface between the negative material 3 and the electrolyte 6) of initial height of the negative material 3, and the bottom end extends to ¾ (the initial point is on the interface between the positive material 7 and the positive electrical current collector 9) of initial height of the positive material 7 (the thickness of partitions is zero and all chemical reactions are ignored, these lead to the difference of partitions' thickness from above content). The material of the grid device 5 is electrically and magnetically insulated, and corrosion resistance.

3. In numerical simulations, each interface (one is between the negative material 3 and the electrolyte 6, the other is between the electrolyte 6 and the positive material 7) of two terms can be set to at the same horizontal level in each child zone separated by partitions easily, therefore, those rectangular holes 8 on partitions are not needed. In actual operation of LMBs, the materials are added into LMBs in solid state, and then they are heated to liquid state. So these rectangular holes 8 are necessary in real working.

4. The thickness in vertical direction of the electrolyte 6 is ⅛ of effective height of the LMB's shell.

5. The material of the shell 1 is electrically insulated, high temperature resistance and corrosion resistance.

6. The thickness of partitions of the grid device 5 is zero, but the material is set to be electrically and magnetically insulated, and corrosion resistant.

Numerical simulations are performed for above LMB with and without the grid device 5. The results indicate that, the present newly invented structures can drastically improve the critical charging/discharging electrical current/electrical voltage, and can effectively suppress multi-instabilities in LMBs. In the following, two cases are adopted, i.e., one case without the grid device 5, the other case with the grid device 5 comprising three pairs of partitions, to illustrate the effectiveness of present invention.

TABLE 1

Properties of LMB (Li∥LiCl—KCl∥Pb—Bi) at 500° C.

| Material | Density($\rho$) [kg · m$^{-3}$] | Kinematic viscosity($\nu$) [m$^2$ · s$^{-1}$] | Electrical conductivity($\sigma$) [kg$^{-1}$ · m$^{-3}$ · s$^3$ · A$^2$] | Permeability($\mu$) [kg · m · s$^{-2}$ · A$^{-2}$] |
|---|---|---|---|---|
| Negative material | 484.7 | $6.64 \times 10^{-7}$ | $3.0 \times 10^6$ | $4\pi \times 10^{-7}$ |
| Electrolyte | 1597.9 | $1.38 \times 10^{-6}$ | 187.1 | $4\pi \times 10^{-7}$ |
| Positive material | $1.0065 \times 10^4$ | $1.29 \times 10^{-7}$ | $7.81 \times 10^5$ | $4\pi \times 10^{-7}$ |

Figures 7A, 7B, 7C:
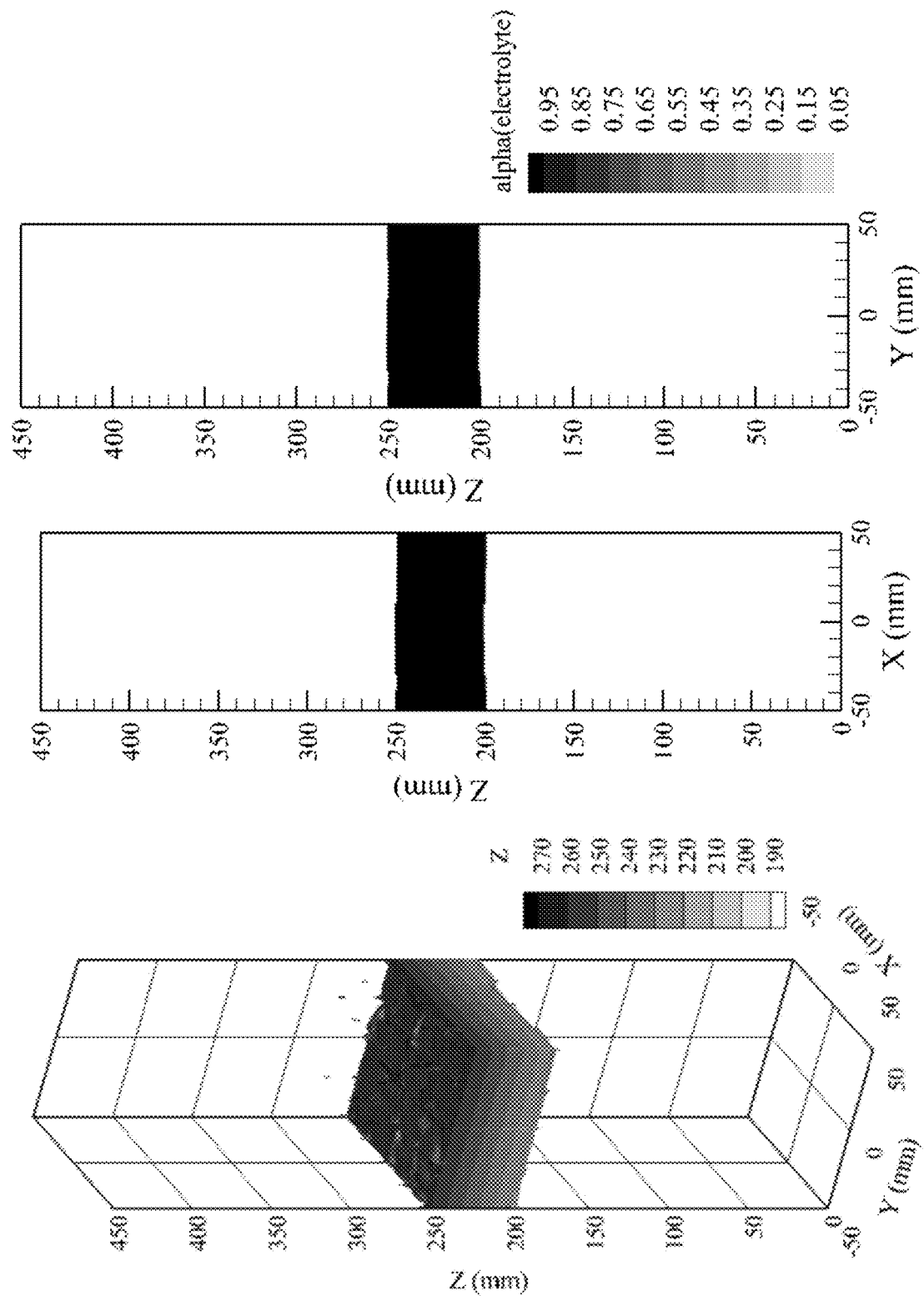
FIG. 7A shows the 3D shape of the electrolyte layer when the applied voltage is 140V with grid device comprising three pairs of partitions.
FIG. 7B shows the 2D shape of the electrolyte layer on a XOZ (y=12.5) plane when the applied voltage is 140V with grid device comprising three pairs of partitions.
FIG. 7C shows the 2D shape of the electrolyte layer on a YOZ (x=12.5) plane when the applied voltage is 140V with grid device comprising three pairs of partitions.
Figure 9:
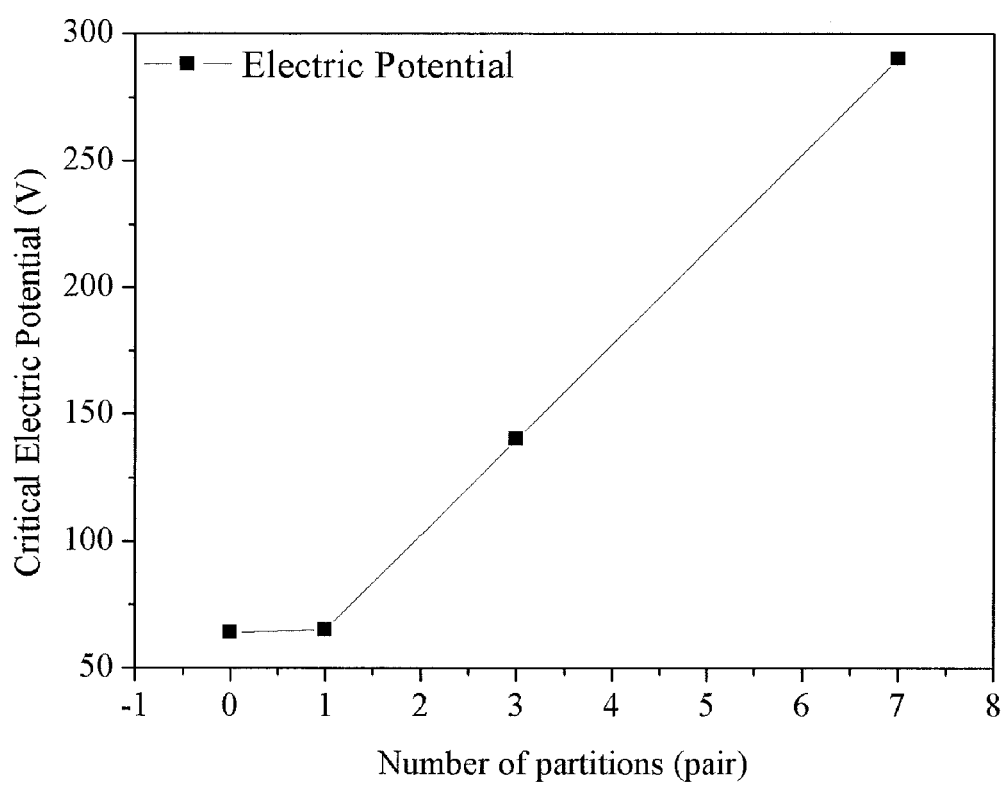
FIG. 9 depicts the critical voltage profile against pair numbers of partitions of grid device when LMBs work stably.

The above Table 1 gives the physical properties of liquid metals and the electrolyte. The imposed voltage is for getting charging/discharging current intensity of LMBs. The 3D and 2D shapes for stable and unstable states of the electrolyte are illustrated comparatively in FIG. 5 ((A)-(F)) without the grid device 5. As shown in plots 5(a)-5(c), there is not fluctuation in the electrolyte layer when the imposed voltage is E=64V and each interface (one is between the negative material 3 and the electrolyte 6, the other is between the electrolyte 6 and the positive material 7) of two terms has the same horizontal level in each child zone separated by partitions, which implies the LMB works stably. However, if the imposed voltage is increased to E=6517, the electrolyte loses its original shape and becomes spray like as shown in plots (D)-(F) of FIG. 5. This will lead to direct contact of liquid metals A and B, and result in short circuit. Simultaneously, the temperature in the LMB will rise immediately and create risk. The streamlines on a YOZ (x=0) plane corresponding to FIG. 5A and FIG. 5D are shown in FIG. 6A and FIG. 6B respectively. From FIG. 6A, the fluid flows are limited within their own layers, and there are only a pair of clearly opposite direction vortexes in metals A and B separately, whilst, there are two pairs of vortexes within the electrolyte. FIG. 6A implies the vorticity conservation in each liquid layer. However in FIG. 6B, the vortexes whether in metal A or B, their left parts have broken through the interfaces and some electrolyte moves to metal A or B. When the imposed voltage is increased to E=70V, three liquid layers are mutual blending as shown in FIG. 6C, and many big and small irregular vortexes appear. Similarly, the 3D and 2D shapes for stable and unstable states of the electrolyte are illustrated comparatively in FIG. 7 ((A)-(F)) but with the grid device 5 comprising three pairs of partitions. As shown in plots (A)-(C) of FIG. 7, the electrolyte keeps its original shape when the imposed voltage is less or equal to the critical value (E=140V) and each interface (one is between the negative material 3 and the electrolyte 6, the other is between the electrolyte 6 and the positive material 7) of two terms has the same horizontal level in each child zone separated by partitions, which implies the LMB works stably. However, if the imposed voltage is increased to E=142.517 (slightly larger than the critical value), the electrolyte 6 cannot keep its original shape, and becomes spray like, as shown in plots (D)-(F) of FIG. 7. This will lead to direct contact of liquid metals A and B, and result in short circuit. Simultaneously, the temperature in the LMB will rise immediately and create risk. The streamlines on a YOZ (x=12.5 mm) plane corresponding to FIG. 7A and FIG. 7D are shown in FIG. 8A and FIG. 8B, respectively. From FIG. 8A, the fluid flows are limited within their own layers, and there are only one pair of opposite direction vortexes in metals A and B separately, whilst, there is no vortex within the electrolyte 6. FIG. 8A implies the vorticity conservation in each liquid layer. However, in FIG. 8B, the three layers are completely mutual blending, and there are many big and small irregular vortexes, which imply the onset of short circuit. More numerical simulations are conducted to test the effectiveness of the grid device 5. By increasing the imposed voltage gradually for finding out the turning point from stable state to unstable state of the LMB, the critical voltages corresponding to the increased pair numbers (0, 1, 3 and 7) of partitions of the grid device 5 are found as shown in FIG. 9. It clearly shows that, when the pair number of partitions of the grid device 5 is more than one, the critical voltage rises in a linear way with the increases of pair number of partitions of the grid device 5. In other words, the critical charging/discharging current/potential of those LMBs with the grid device 5 can be obviously improved with the increasing pair number of partitions, which further illustrates that the grid device 5 can drastically improve the stability of LMBs. In other words, for LMBs with the same parameters, the grid device 5 can obviously improve the efficiency of LMBs.

From numerical simulations, the more pair of partitions in the grid device 5, the more obvious effect of the grid device 5 on suppressing multi-instabilities in LMBs, (as shown in FIG. 9, the critical voltage of the LMB with the grid device 5 comprising seven pairs of partitions rises almost 5 times of that without the grid device 5). While, the assembling of the grid device 5 in LMBs will occupy some available room, then the total amount of liquid metals A and B, and of the electrolyte will decrease when the whole volume of a LMB is fixed. Moreover, the total capacities of LMBs depend on the amount of liquid metals A and B disregarding instabilities. In this view, there is a conflict between the pair number of partitions and the total capacities of LMBs, so, it doesn't say, the more pairs of the partitions, the better. In principle, in the domain where there is the grid device 5, after subtracting the gross area of the grid device 5, the fluid flow area should occupy at least $\sqrt{2}/2$ of the total section area of LMB in horizontal sections. Finally, how many pairs of partitions should be inserted, it depends on many factors, such as, the size of LMB, the thickness of partition, the materials of liquid metals A and B, and the electrolyte, the thickness of the electrolyte layer, etc.

The introduction of the rectangular holes 8 on partitions is to assure that, each interface (one is between the negative material 3 and the electrolyte 6, the other is between the electrolyte 6 and the positive material 7) of two terms has the same horizontal level in each child zone separated by partitions, and the rectangular holes 8 cannot against the main targets of the grid device 5 (to change the distributions of flow and induced magnetic fields within LMBs). Thus the rectangular holes 8 should only be set at special positions on partitions, right next to the inner walls of LMBs or right next to the junctions of any two partitions. In this way, no magnetic induction line continually passes through four or more rectangular holes to form an enclosed loop. There is only one rectangular hole on each side edge (except the inside walls of LMBs) of grid, which is enclosed by partitions or by partitions and inside wall/walls of LMBs. The lower limit of the rectangular holes' 8 width should be the minimal size that can assure the electrolyte and liquid metals can smoothly flow through the rectangular holes 8 (e.g., 4 mm), but the width shouldn't be greater than ⅕ of the corresponding width of that side edge of grid, which is enclosed by partitions or by partitions and inside wall/walls of LMBs.

The height of the rectangular holes 8 in the vertical direction should be greater than the maximum displacement of the electrolyte 6 during charging/discharging process. Because there is no gap between the top end of the grid device 5 and the negative electrical current collector 2 or the top end of the grid device 5 is directly embedded in the negative electrical current collector 2, the top end of the rectangular holes 8 can be just higher than the maximum displacement of the electrolyte 6 when it moves up during discharging process, the bottom end of the rectangular holes 8 should be lower than the maximum displacement of the electrolyte 6 when it moves down during charging process, and the bottom end of the rectangular holes 8 will extend to the ⅔-7/12 of initial height of the positive material 7 (When the bottom end of the grid device 5 only extends to the ⅔ of initial height of the positive material 7, the bottom end of the rectangular holes 8 and the bottom end of the grid device 5 will be at the same horizontal level).

The present invention concerned with the grid device 5 is mainly used for fine-high type (smaller horizontal section area but higher) square section LMBs. The thickness of the electrolyte layer 6 may be chosen as ⅕-1/40 of the height of the shell 1. Under the premise of stably operation, it is prioritized to choose thinner electrolyte layer to reduce the electrical energy waste.

The invention claimed is:

1. Square section liquid metal batteries (LMBs) with a grid device to suppress the instabilities of fluids, comprising:
    a shell,
    an electrical current collector of a negative electrode,
    a negative material,
    metallic nets or metallic plates,
    a grid device,
    an electrolyte,
    a positive material,
    rectangular holes,
    an electrical current collector of a positive electrode;
    wherein the positive material, the electrolyte and the negative material are filled and stratified in the shell from bottom to top; the positive material and the negative material are liquid metals or alloys; the electrolyte is liquid molten salt; densities of three layers have a sequence of positive material>electrolyte>negative material; the electrical current collector of the negative electrode and the electrical current collector of the positive electrode are linked with the negative material and the positive material respectively from outside of LMBs; the grid device within the shell is composed of partitions crossing each other, and the grid device passes through the negative material and the electrolyte vertically in sequence, and extends to an inside of the positive material; there is no gap between a top end of the grid device and the electrical current collector of the negative electrode to avoid movement of the negative material when an electrical current density changes; a bottom end of the grid device is lower than a maximum displacement of the electrolyte during a charging process, and extends to ⅔-½ of an initial height of the positive material to assure that the instabilities in LMBs are suppressed by the grid device during a whole process of charging/discharging; a core of each partition of the grid device is a metallic net or a metallic plate, and the rectangular holes are opened on the partitions of the grid device; a vertical height of each rectangular hole is larger than the maximum displacement of the electrolyte during charging/discharging to keep two liquid interfaces of LMBs at their own horizontal level respectively, and a distribution of the rectangular holes is to prevent a formation of a single enclosed induced magnetic loop in a whole liquid metal battery or a formation of a medium-sized enclosed induced magnetic field loop through the rectangular holes.

2. The square section liquid metal batteries (LMBs) with the grid device to suppress the instabilities of fluids according to claim 1, wherein:
    the partitions are assembled to form a uniform grid in horizontal sections of LMBs; when a pair number of the partitions is greater than one, a special design is introduced for processing and installation; when the pair number of the partitions is even, a structure of the grid device is centrosymmetric and the grid device is mounted by splicing because of a limitation of a distribution of the rectangular holes; when placing the grid device with two pairs of partitions, two-stage splicing grid device is used; when the pair number of partitions is odd, the structure of the grid device is axisymmetric or centrosymmetric and the grid device is mounted by splicing because of the limitation of the distribution of the rectangular holes; when placing the grid device with three pairs of partitions, three-stage splicing grid device is used.

3. The square section liquid metal batteries (LMBs) with the grid device to suppress the instabilities of fluids according to claim 1, wherein:
    there is no space between the grid device and side walls of LMBs, the partitions directly touch an inner wall of the shell; the top end of the grid device is directly embedded into the electrical current collector of the negative electrode, or directly contacts with the electrical current collector of the negative electrode; the bottom end of the grid device is lower than the maximum displacement of the electrolyte during the charging process, and extends to ⅔-½ of the initial height of the positive material; a thickness of each partition of the grid device is 1/60-1/100 of a side width of the shell; a material of the grid device is electrically and magnetically insulated, and is corrosion resistant.

4. The square section liquid metal batteries (LMBs) with the grid device to suppress the instabilities of fluids according to claim 1, wherein:
    regulations for the rectangular holes on the partitions comprise: firstly, the rectangular holes are set at special positions on the partitions, right next to inner walls of LMBs or right next to junctions of any two partitions; secondly, no magnetic induction line continually passes through four or more rectangular holes to form an enclosed loop; thirdly, except inside walls of LMBs, there is only one rectangular hole on each side edge of a grid, which is enclosed by the partitions or by the partitions and the inside wall/walls of LMBs; finally, a width of each rectangular hole is not greater than ⅕ of a corresponding width of the side edge of the grid, which is enclosed by the partitions or by the partitions and the inside wall/walls of LMBs and a lower limit of the width of each rectangular hole guarantees smooth flowing through by the liquid metals or the electrolyte.

5. The square section liquid metal batteries (LMBs) with the grid device to suppress the instabilities of fluids according to claim 3, wherein:

regulations for the rectangular holes on the partitions comprise: firstly, the rectangular holes are set at special positions on the partitions, right next to inner walls of LMBs or right next to junctions of any two partitions; secondly, no magnetic induction line continually passes through four or more rectangular holes to form an enclosed loop; thirdly, except inside walls of LMBs, there is only one rectangular hole on each side edge of a grid, which is enclosed by the partitions or by the partitions and the inside wall/walls of LMBs; finally, a width of each rectangular hole is not greater than $1/5$ of a corresponding width of the side edge of the grid, which is enclosed by the partitions or by the partitions and the inside wall/walls of LMBs and a lower limit of the width of each rectangular hole is a minimal size that guarantees smooth flowing through by the liquid metals or the electrolyte.

6. The square section liquid metal batteries (LMBs) with the grid device to suppress the instabilities of fluids according to claim 1, wherein:

in the square section LMBs, a top end of each rectangular hole is higher than the maximum displacement of the electrolyte when it moves up during the discharging process; a bottom end of each rectangular hole is lower than the maximum displacement of the electrolyte when it moves down during the charging process, and the bottom end of each rectangular hole extends to $2/3$-$7/12$ of the initial height of the positive material; when the bottom end of the grid device only extends to the $2/3$ of the initial height of the positive material, the bottom end of each rectangular hole and the bottom end of the grid device are at a same horizontal level.

7. The square section liquid metal batteries (LMBs) with the grid device to suppress the instabilities of fluids, according to claim 3 wherein:

in the square section LMBs, a top end of each rectangular hole is higher than the maximum displacement of the electrolyte when it moves up during the discharging process; a bottom end of each rectangular hole is lower than the maximum displacement of the electrolyte when it moves down during the charging process, and the bottom end of each rectangular hole extends to $2/3$-$7/12$ of the initial height of the positive material; when the bottom end of the grid device only extends to $2/3$ of the initial height of the positive material, the bottom end of each rectangular hole and the bottom end of the grid device are at a same horizontal level.

8. The square section liquid metal batteries (LMBs) with the grid device to suppress the instabilities of fluids according to claim 4, wherein:

in the square section LMBs, a top end of each rectangular hole is higher than the maximum displacement of the electrolyte when it moves up during the discharging process; a bottom end of each rectangular hole is lower than the maximum displacement of the electrolyte when it moves down during the charging process, and the bottom end of each rectangular hole extends to $2/3$-$7/12$ of the initial height of the positive material; when the bottom end of the grid device only extends to $2/3$ of the initial height of the positive material, the bottom end of each rectangular hole and the bottom end of the grid device are at a same horizontal level.

9. The square section liquid metal batteries (LMBs) with the grid device to suppress the instabilities of fluids according to claim 1, wherein:

a thickness or a height in a vertical direction of the electrolyte is $1/5$-$1/40$ of a total height of the shell; in a domain where there is the grid device, a fluid flow area occupies at least $\sqrt{2}/2$ of a total section area of the LMBs in horizontal sections.

10. The square section liquid metal batteries (LMBs) with the grid device to suppress the instabilities of fluids according to claim 6, wherein:

a thickness or a height in a vertical direction of the electrolyte is $1/5$-$1/40$ of a total height of the shell; in a domain where there is the grid device, a fluid flow area occupies at least $\sqrt{2}/2$ of a total section area of the LMBs in horizontal sections.

\* \* \* \* \*